Figure 1:
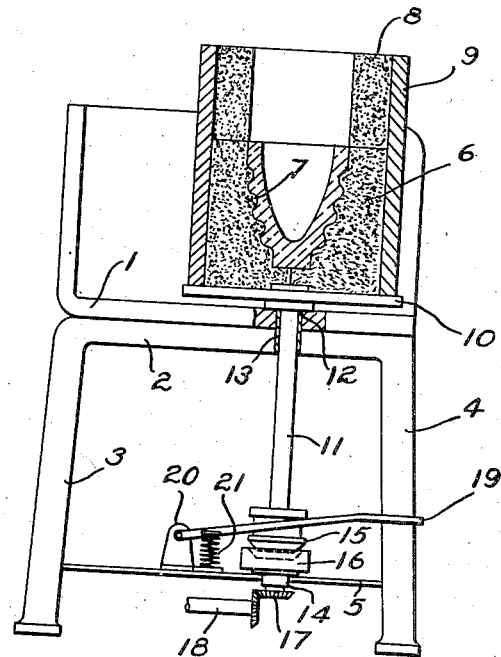

May 31, 1927.

K. C. RANDALL 1,630,762

METHOD OF AND APPARATUS FOR FORMING INSULATORS

Original Filed May 11, 1921

WITNESSES:
L. F. Sonnemann
W. B. Jaspert

INVENTOR
Karl C. Randall.
BY
Wesley G. Carr
ATTORNEY

Patented May 31, 1927.

1,630,762

UNITED STATES PATENT OFFICE.

KARL C. RANDALL, OF EDGEWOOD PARK, PENNSYLVANIA, ASSIGNOR TO WESTINGHOUSE ELECTRIC & MANUFACTURING COMPANY, A CORPORATION OF PENNSYLVANIA.

METHOD OF AND APPARATUS FOR FORMING INSULATORS.

Application filed May 11, 1921, Serial No. 468,701. Renewed April 27, 1927.

My invention relates to improvements in the forming of plastic bodies for the manufacture of articles of porcelain or the like and more especially to a method of forming hollow insulators of baked earthy materials used for mounting electrical conductors.

Heretofore, it has been customary to form hollow porcelain articles by mixing the various earthy constituents into a plastic mass which was placed in a plaster of Paris mold of the shape or form desired in the finished article. Since the usual types of porcelain articles are hollow, it was customary to hollow out the center of the clay by gradually displacing it with the fingers or with suitably shaped tools.

The strength of a porcelain article is not in proportion to the thickness of the wall portion, but lies largely in the casing or baked outer surfaces thereof. It is, therefore, desirable to form such articles with relatively thin walls so as to obtain minimum weight without sacrificing strength, resulting in a saving of material.

The method of hollowing the articles as described above was subject to disadvantages since it was controlled entirely by the skill of the operator and it was difficult to obtain a wall of uniform cross-section thereby. Imperfections, such as surface scratches in the material, folds or creases, variable densities of different portions thereof and porosity of the material were numerous.

Another process for forming hollow articles of earthy materials was to form a relatively thin mixture of the ingredients which was poured into static plaster of Paris molds. The heavier elements would settle and dry near the surface of the mold, leaving the center in a fluid condition. The liquid was drawn off or scooped out and the molded article was removed from the mold for drying and baking.

This method had advantages over the hand forming process in which clay materials were employed in that an article of greater homogeneity was produced. However, a serious disadvantage was the relatively long time required for the material to settle, which limited the capacity of the molds.

My invention obviates these difficulties, it being among the objects thereof to form hollow plastic articles of uniform quality, that are mechanically stronger than similar articles heretofore produced, and are electrically efficient in systems for transmitting relatively heavy currents and which are of a grainless, thoroughly homogeneous structure.

It is a further object of this invention to provide apparatus for forming such articles which is simple in its operation and is suitable for quantity production.

In practicing my invention, I provide a mold of absorbent material such as plaster of Paris, which I mount within a hollow container having an opening in one end thereof and which is secured to a rotatable spindle mounted in suitable bearings in a supporting member. The free end of the spindle is provided with a friction transmission device connected to a source of power, such as a motor. Means are provided for actuating the spindle through the transmission to cause it to rotate.

To form a hollow porcelain article in accordance with this invention, I fill a plaster of Paris mold with a thin mixture of neat porcelain cement made from materials which are entirely free from metal and having the usual fillers added to make the resultant article non-hygroscopic. I then rotate the mold at a relatively high speed, causing the heavier elements of the thin mixture to be thrown to the outside. The separated liquid may then be drawn off or poured out and the compact body removed from the mold for drying and baking.

Figure 2:
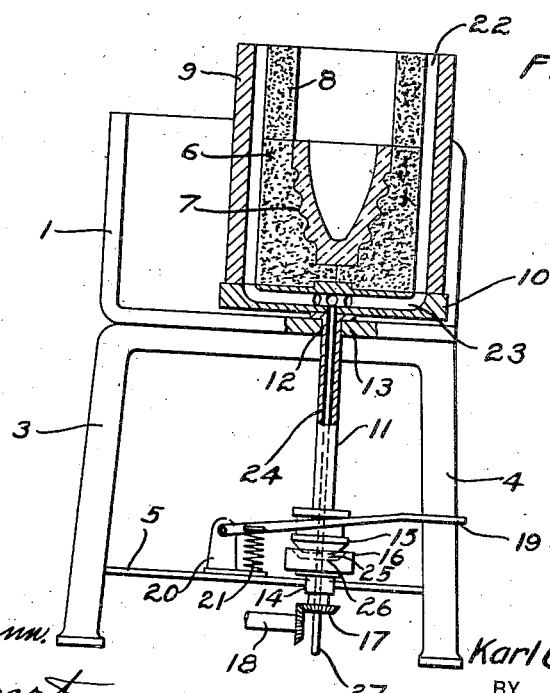

The high speed of rotation of the material results in an article of grainless, thoroughly homogeneous character which is much stronger than that formed in the ordinary static manner and, if properly dried and baked so as to become essentially non-hygroscopic, a stronger form of insulator will be obtained. A more detailed description of the apparatus employed is as follows:

In the accompanying drawing, forming a part hereof and in which like reference characters designate like parts, Figure 1 is a side elevational view, partially in section, of a mold mounted on a suitable support having means for rotating the same, and Fig. 2 is a side elevational view, partially in section, of a similar apparatus having additional means for drying the absorbent material of the mold by an air blast.

My apparatus consists of a work-table 1 secured to a base member 2 having a plurality of supporting members 3 and 4 and a supporting bracket 5. A split mold 6 having a corrugated surface 7 formed therein and having a removable portion 8 is held in position by a hollow container or workholder 9 having a base plate 10 secured to a rotatable spindle 11 which extends through an opening 12 in the member 1 and which is mounted in the bearing member 13.

A friction member 15 is slidably secured to the free end of the member 11. A co-operating friction member 16 is mounted in bearing 14 on the supporting bracket 5 and is connected to a set of beveled gears 17 which may be actuated by a source of power 18. A shifting member 19 engages a collar secured to member 15 and is pivoted on the bracket 20. It is kept in a neutral position by the coil spring 21. By pressing the member 19 downward the member 15 is brought into intimate engagement with the rotating member 16, actuating the spindle 11, thereby causing the mold 6 to rotate.

The apparatus shown in Fig. 2 is similar to that described above, excepting that it is further provided with a plurality of openings 22 in the mold communicating with annular groove 23 in the member 10. The driving spindle 11 is provided with an opening 24, which extends longitudinally therethrough and is in communication with the groove 23. The end 25 of the member 11 is chamfered to provide a seat which engages a similarly chamfered end 26 of the member 16 to form a connection to a source 27 of air under pressure.

The operation of my apparatus is briefly as follows:

I partially fill the mold 6 with a thin mixture of neat porcelain cement. The shifting member 19 is pressed downwardly, bringing members 15 and 16 into intimate engagement, actuating the spindle 11, and causing the mold 6 to rotate. The heavier elements of the mixture are forced to the wall of the mold and caused to settle, resulting in the accumulation of the excess liquid which is drawn off by a hand manipulated suction tube or the like. The member 19 is then released, allowing it to spring back to a neutral position, thereby separating the transmission members 15 and 16. When the mold 6 comes to a stop it is dissembled and the formed insulator body is removed.

By applying an air blast while the mold is in operation to provide forced circulation through the openings 22 it is possible to maintain it in a relatively dry state, permitting its use continuously without intermittent drying.

The operation is then repeated as set forth above.

From the above description of my invention it will be readily seen that the apparatus I employ provides a mechanically simple means for producing hollow plastic bodies in large quantities in an inexpensive manner. Articles made in accordance with this invention are of more uniform quality and have greater mechanical strength than those produced by static means and subjected to the variables of the manual labor applied.

Although I have described a specific embodiment of my invention, it will be obvious to those skilled in the art that various modifications may be made in the form of apparatus used and the kinds of materials employed. For instance, I may use any suitable absorbent materials in place of the plaster of Paris molds or, in some instances, non-absorbent materials may be employed. It is obvious that I may utilize any suitable plastic materials for forming hollow bodies such as I have described without departing from the principles herein set forth.

I claim as my invention:—

1. An apparatus for forming bodies of plastic material comprising a plaster-of-Paris mold, a hollow container secured to a base plate having an annular groove formed therein, said mold having a plurality of annular openings communicating with said annular groove, a hollow spindle secured to said base plate, the opening thereof communicating with said annular groove, a friction member attached to the lower end of said hollow spindle, a cooperating friction member secured to a source of power, means for directing an air blast through said hollow spindle to said groove and into the openings of said mold, and means for bringing said friction members into engagement to rotate said spindle.

2. A method of forming hollow bodies of plastic material which comprises providing a rotatable mold of absorbent material, filling said mold with a relatively thin material, rotating said mold to centrifugally force the heavier elements of said mixture to the outside of said mold, causing the liquid to form in the center, drawing off said liquid and causing the moisture to be absorbed by said mold and removing said formed body from said mold and drying and baking the same.

3. A method of forming hollow bodies of plastic material which comprises providing a rotatable plaster-of-Paris mold, filling said mold with neat Portland cement free from metallic impurities, and rotating said mold to force the heavier elements of said mixture to the outer wall thereof to form a grainless, homogeneous hollow body.

4. A method of forming hollow bodies of plastic material which comprises providing a rotatable plaster-of-Paris mold, filling said mold with neat Portland cement free from metallic impurities and having suitable fillers added thereto, and rotating said mold to force the heavier elements of said mixture to the outer wall thereof to form a grainless, homogeneous hollow body.

In testimony whereof, I have hereunto subscribed my name this 28th day of April, 1921.

KARL C. RANDALL.